(12) United States Patent
Shiogai et al.

(10) Patent No.: US 9,043,068 B2
(45) Date of Patent: May 26, 2015

(54) DISPLAY DEVICE OF ELECTRIC VEHICLE

(71) Applicant: HONDA MOTOR CO., LTD., Tokyo (JP)

(72) Inventors: Akira Shiogai, Utsunomiya (JP);
Takeshi Taguchi, Saitama (JP);
Yuusuke Maino, Utsunomiya (JP);
Hiroshi Furumi, Utsunomiya (JP);
Masanobu Asakawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/355,024

(22) PCT Filed: Oct. 17, 2012

(86) PCT No.: PCT/JP2012/076806
§ 371 (c)(1),
(2) Date: Apr. 29, 2014

(87) PCT Pub. No.: WO2013/069421
PCT Pub. Date: May 16, 2013

(65) Prior Publication Data
US 2014/0288751 A1    Sep. 25, 2014

(30) Foreign Application Priority Data

Nov. 7, 2011   (JP) .................................. 2011-243113

(51) Int. Cl.
*B60L 11/00*   (2006.01)
*G08G 1/123*   (2006.01)
(Continued)

(52) U.S. Cl.
CPC . *B60L 3/12* (2013.01); *B60L 1/003* (2013.01); *B60L 11/007* (2013.01);
(Continued)

(58) Field of Classification Search
CPC . B60W 20/00; B60W 10/08; B60W 2540/12; B60W 2710/083; B60W 2510/244; B60W 2710/0666; B60W 10/26; B60W 2540/10; B60W 10/196; B60L 11/1881; B60L 1/003; B60L 2250/16; B60L 2260/52
USPC ..................................... 701/22; 340/988–996
See application file for complete search history.

(56) References Cited

U.S. PATENT DOCUMENTS

| 5,426,589 A | 6/1995 | Kitagawa et al. |
| 2005/0177285 A1 | 8/2005 | Honda |

(Continued)

FOREIGN PATENT DOCUMENTS

| JP | 5-83805 A | 4/1993 |
| JP | 2005-198437 A | 7/2005 |

(Continued)

OTHER PUBLICATIONS

International Search Report dated Jan. 8, 2013 corresponding to International Patent Application No. PCT/JP2012/076806 and English translation thereof.

*Primary Examiner* — Muhammad Shafi
(74) *Attorney, Agent, or Firm* — Squire Patton Boggs (US) LLP (57) ABSTRACT

Provided is a display device of an electric vehicle that enables an occupant of an electric vehicle to more easily realize an effect of regeneration of braking energy. This display device of the electric vehicle calculates integrated cumulative value of the actual driving distance of the electric vehicle as a first distance, calculates, upon detecting regeneration of braking energy, integrated cumulative value of a drivable distance extended by the regeneration of the braking energy as a second distance, and displays both the first distance and the second distance on a display section.

3 Claims, 7 Drawing Sheets

(51) Int. Cl.
*B60L 3/12* (2006.01)
*B60L 1/00* (2006.01)
*B60L 11/18* (2006.01)
*B60L 7/14* (2006.01)
*B60L 15/20* (2006.01)

(52) U.S. Cl.
CPC ........ *B60L 11/1881* (2013.01); *B60L 2200/10* (2013.01); *B60L 2200/12* (2013.01); *B60L 2240/12* (2013.01); *B60L 2240/461* (2013.01); *B60L 2240/662* (2013.01); *B60L 2250/16* (2013.01); *B60L 2260/52* (2013.01); *B60L 7/14* (2013.01); *B60L 11/1803* (2013.01); *B60L 15/2018* (2013.01); *Y02T 90/16* (2013.01); *Y02T 90/34* (2013.01); *B60L 15/2045* (2013.01); *Y02T 10/7283* (2013.01); *Y02T 10/7291* (2013.01)

(56) References Cited

U.S. PATENT DOCUMENTS

| | | | |
|---|---|---|---|
| 2007/0205735 A1* | 9/2007 | Kiuchi et al. | 318/432 |
| 2008/0111669 A1* | 5/2008 | Yamanaka et al. | 340/435 |
| 2008/0231498 A1* | 9/2008 | Menzer et al. | 342/134 |
| 2009/0277704 A1 | 11/2009 | Yamaguchi | |
| 2011/0010030 A1 | 1/2011 | Yamamoto | |
| 2011/0205044 A1 | 8/2011 | Enomoto et al. | |

FOREIGN PATENT DOCUMENTS

| | | |
|---|---|---|
| JP | 2007-312581 A | 11/2007 |
| JP | 2009-038895 A | 2/2009 |
| JP | 2009-55675 A | 3/2009 |
| JP | 2011-153859 A | 8/2011 |
| WO | WO 2008/065837 A1 | 6/2008 |

* cited by examiner

EXAMPLE OF DISPLAY FROM NON-DISPLAY

DISPLAY DEVICE OF ELECTRIC VEHICLE

TECHNICAL FIELD

The present invention relates to a display device for an electric vehicle (display device of an electric vehicle) which is propelled by supplying electric power from an electric storage device to a first electric motor, converts deceleration energy of the electric vehicle into electric power with the first electric motor or a second electric motor, and stores the electric power as regenerated electric energy in the electric storage device.

BACKGROUND ART

There has been proposed a device for indicating an amount of deceleration energy generated when a vehicle is decelerated, i.e., an amount of regenerated energy, to the driver of the vehicle {Japanese Laid-Open Patent Publication No. 2009-038895 (hereinafter referred to as "JP2009-038895A")}. JP2009-038895A has an object to provide an amount-of-regenerated-energy indicating device for allowing the driver of a hybrid vehicle to recognize how much regenerated energy has been produced by the way the driver drives the hybrid vehicle and how much the driver has contributed to energy-saving driving of the vehicle (Abstract, [0006]). To achieve the above object, a hybrid control apparatus 15 according to JP2009-038895A integrates an amount of generated electric energy detected by an amount-of-generated-electric-energy detector 43 until the distance that a vehicle 1 has traveled reaches a predetermined distance, and divides the integrated amount of generated electric energy by the predetermined distance, thereby calculating a section amount of charged electric energy. A display device 19 displays on its screen the section amount of charged electric energy calculated by the hybrid control apparatus 15 (Abstract). The display device 19 displays the section amount of charged electric energy at all times if the section amount of charged electric energy can be calculated (see FIG. 2).

There is a technology for scoring an accelerating operation of the driver of a vehicle, a braking operation of the driver, and an engine idling operation performed by the driver, and displaying the scores as driving evaluations (U.S. Patent Application Publication No. 2011/0205044 (hereinafter referred to as "US2011/0205044A1").

SUMMARY OF INVENTION

According to JP2009-038895A, as described above, the display device displays on its screen a section amount of generated electric energy calculated by dividing an integrated amount of electric energy that has been regenerated, by a predetermined distance. However, even though the section amount of generated electric energy is displayed, the user may possibly find it difficult to understand a specific effect achieved by the displayed section amount of generated electric energy. According to JP2009-038895A, the display device displays the section amount of charged electric energy at all times if the section amount of charged electric energy can be calculated. Consequently, much remains to be improved with respect to the effective display timing for the user.

The present invention has been made in view of the above drawbacks. It is an object of the present invention to provide a display device for an electric vehicle which allows the occupant of the electric vehicle to easily realize an effect of regeneration of electric energy from decelerating energy of the electric vehicle.

According to the present invention, there is provided a display device for an electric vehicle which is propelled by supplying electric power from an electric storage device to a first electric motor, converts deceleration energy of the electric vehicle into electric power with the first electric motor or a second electric motor, and stores the electric power as regenerated electric energy in the electric storage device, the display device being configured to calculate an integrated value of an actual traveled distance of the electric vehicle as a first distance, detect that the deceleration energy is regenerated, calculate an integrated value of a traveling range which is increased by regeneration of the deceleration energy, as a second distance, and display the first distance and the second distance on one display unit.

According to the present invention, the integrated value of the actual traveled distance of the electric vehicle is displayed as the first distance on the display unit, and the integrated value of the traveling range which is increased by regeneration of the deceleration energy is displayed as the second distance on the display unit. Consequently, the regenerated deceleration energy (regenerated energy) can be converted into the integrated value of the traveling range for easy comparison with the integrated value of the actual traveled distance of the electric vehicle, thus allowing an occupant of the electric vehicle to appreciate how effective the regenerated deceleration energy is.

The display device may be configured to judge whether the second distance is to be displayed or not based on a predetermined display condition, and display the second distance only if the predetermined display condition is satisfied. Therefore, the integrated value of the traveling range that corresponds to the regenerated deceleration energy can be displayed in a situation that is appropriate for the occupant.

The display device may be configured to judge whether an accelerating or decelerating operation by the driver of the electric vehicle is an operation to increase the traveling range or not, and display the judgment as a driving evaluation, switch from the displaying of the driving evaluation to the displaying of the second distance, and display the second distance in the same position as the position where the driving evaluation is displayed. Since the driving evaluation and the integrated value of the traveling range on regenerated deceleration energy are displayed in the same position, the occupant finds it easy to associate the driving evaluation with the integrated value of the traveling range which corresponds to the regenerated deceleration energy, and hence can look at the driving evaluation more objectively.

The predetermined display condition may be a timing when the electric vehicle is stopped after the deceleration energy is regenerated while the electric vehicle is travelling downhill. Generally, when the deceleration energy is regenerated while the electric vehicle is travelling downhill, it is possible to regenerate a relatively large amount of deceleration energy, and the traveling range corresponding to the regenerated amount of deceleration energy is increased. Consequently, the occupant who sees the integrated value of the traveling range is able to recognize how important the regeneration of the deceleration energy is.

DESCRIPTION OF EMBODIMENTS

A. Embodiment:
1. Description of Overall Arrangement:
[1-1. Overall Arrangement]

Figure 1:
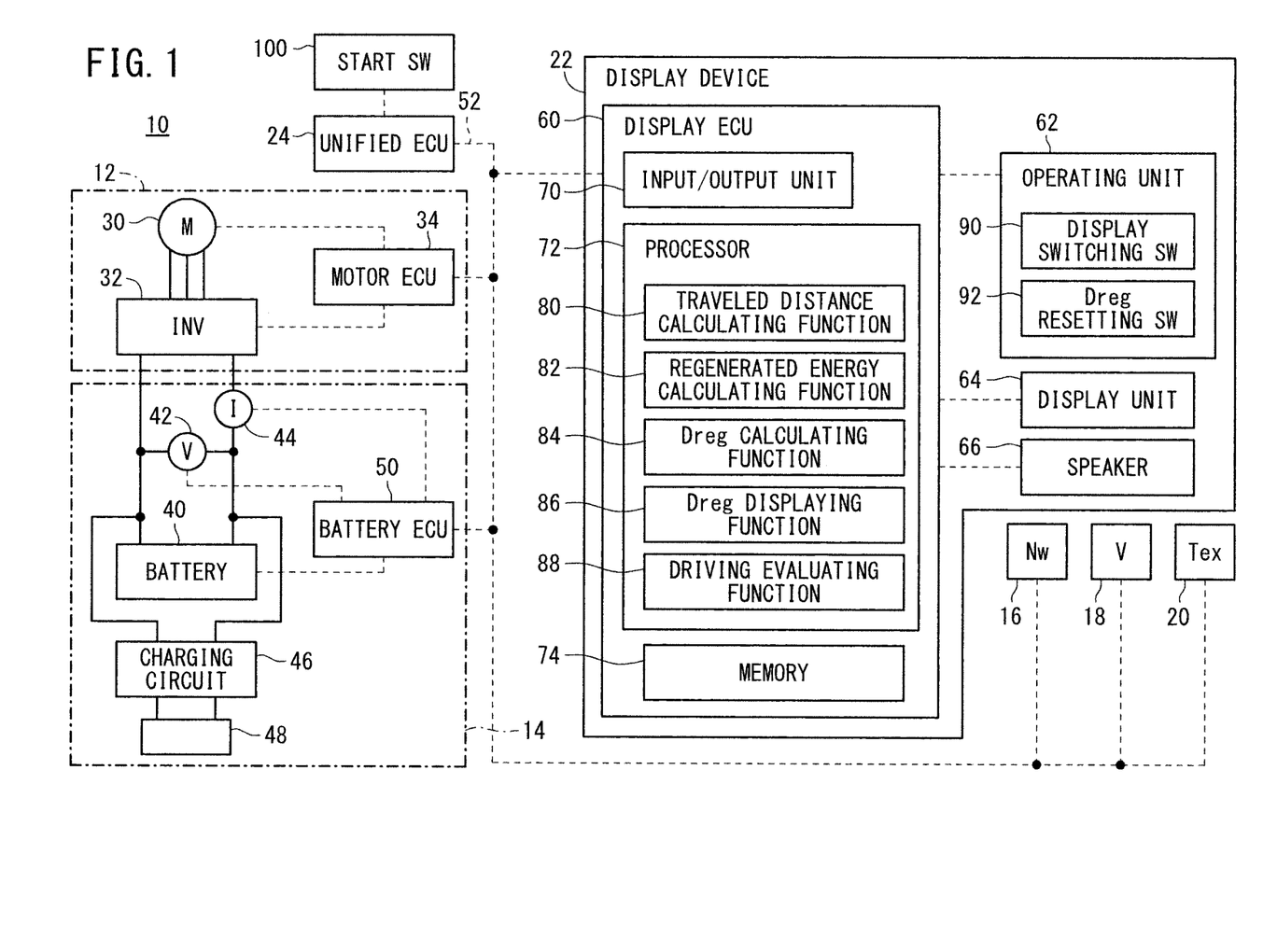
FIG. 1 is a block diagram showing the general overall arrangement of an electric vehicle incorporating a display device according to an embodiment of the present invention.

FIG. 1 is a block diagram showing the general overall arrangement of an electric vehicle 10 (hereinafter referred to as "vehicle 10") incorporating a display device 22 according to an embodiment of the present invention. As shown in FIG. 1, the vehicle 10 includes, in addition to the display device 22, a drive force generating system 12, an electric power supplying system 14, a wheel rotational speed sensor 16, a vehicle speed sensor 18, an external air temperature sensor 20, and a unified electronic control unit 24 (hereinafter referred to as "unified ECU 24").

The drive force generating system 12 has a motor (first electric motor), an inverter 32, and a motor electronic control unit 34 (hereinafter referred to as "motor ECU 34"). The electric power supplying system 14 has a high-voltage battery 40 (hereinafter referred to as "battery 40"), a voltage sensor 42, a current sensor 44, a charging circuit 46, a charging connector 48, and a battery electronic control unit 50 (hereinafter referred to as "battery ECU 50").

[1-2. Drive Force Generating System 12]

The motor 30 comprises a three-phase AC brushless motor. The motor 30 generates a drive force F [N] (or torque [N·m]) for the vehicle 10 based on electric power supplied from the battery 40 through the inverter 32. The motor 30 also supplies, to the battery 40, electric power (hereinafter referred to as "regenerated electric power Preg") [W] regenerated by recovering deceleration energy as regenerated energy, thereby charging the battery 40. The motor 30 may supply the regenerated electric power Preg to an unillustrated 12-volt system or unillustrated auxiliaries.

The inverter 32, which is of three-phase bridge configuration, converts direct current into alternating current. The inverter 32 converts DC electric power into three-phase AC electric power and supplies the three-phase AC electric power to the motor 30. The inverter 32 also converts AC three-phase electric power that is regenerated, into DC electric power and supplies the DC electric power to the battery 40.

The motor 30 and the inverter 32 operate while the vehicle 10 is running in both power and regenerative modes. It is assumed that the vehicle 10 runs in the power and regenerative modes unless otherwise specified.

The motor ECU 34 controls the inverter 32 thereby to control output power (propulsive power) of the motor 30 based on commands from the unified ECU 24 and output signals from various sensors including the voltage sensor 42 and the current sensor 44.

[1-3. Electric Power Supplying System 14]

The battery 40, which serves as an electric storage device (energy storage device) including a plurality of battery cells, may comprise a lithium ion secondary battery, a nickel hydrogen secondary battery, a capacitor, or the like. According to the present embodiment, the battery 40 comprises a lithium ion secondary battery.

The voltage sensor 42 detects a voltage across the battery 40 (hereinafter referred to as "battery voltage Vbat"), and supplies the detected battery voltage Vbat to the battery ECU 50. The current sensor 44 detects an output current flowing from the battery 40 and an input current flowing to the battery 40 (both currents will hereinafter be referred to as "battery current Ibat"), and supplies the detected battery current Ibat to the battery ECU 50.

The charging circuit 46 and the charging connect- or 48 are used in charging the battery 40 from an external charging device, not shown. The charging circuit 46 includes circuit parts such as a charger, not shown, etc. The charging connector 48 is used to connect the charging circuit 46 to the external charging device.

The battery ECU 50 is used to manage the battery 40, e.g., to control the opening and closing of a contactor, not shown, while monitoring the battery voltage Vbat and the battery current Ibat, etc.

[1-4. Wheel Rotational Speed Sensor 16, Vehicle Speed sensor 18, external air temperature sensor 20]

The wheel rotational speed sensor 16 detects the number of revolutions of a wheel, not shown (hereinafter referred to as "wheel rotational speed Nw") [rev], and outputs the detected wheel rotational speed Nw to the display device 22, the unified ECU 24, etc. via a communication line 52. The vehicle speed sensor 18 detects the vehicle speed V [km/h] of the vehicle 10 and outputs the detected vehicle speed V to the display device 22, the unified ECU 24, etc. via the communication line 52. The vehicle speed sensor 18 detects the vehicle speed V based on the wheel rotational speed Nw from the wheel rotational speed sensor 16, for example. The external air temperature sensor 20 detects the external air temperature (hereinafter referred to as "external air temperature Tex") [° C.] around the vehicle 10, and outputs the detected external air temperature Tex to the display device 22, the unified ECU 24, etc. via the communication line 52.

[1-5. Display Device 22]

(1-5-1. Overall Arrangement)

The display device 22 presents information about the vehicle 10 to the user. As shown in FIG. 1, the display device 22 has a display electronic control unit 60 (hereinafter referred to as "display ECU 60"), an operating unit 62, a display unit 64, and a speaker 66.

(1-5-2. Display ECU 60)

The display ECU 60 displays various items of information based on output signals from the wheel rotational speed sensor 16, the vehicle speed sensor 18, and the external air temperature sensor 20. As shown in FIG. 1, the display ECU 60 has an input/output unit 70, a processor 72, and a memory 74. The input/output unit 70 is used to exchange signals with various components. The processor 72, which performs various processing operations, includes a traveled distance calculating function 80, a regenerated energy calculating function 82, a traveling range calculating function 84 (hereinafter referred to as "Dreg calculating function 84"), a traveling range displaying function 86 (hereinafter referred to as "Dreg displaying function 86"), and a driving evaluating function 88.

The traveled distance calculating function 80 is a function to calculate an actual traveled distance D [km] (integrated value) of the vehicle 10 based on the wheel rotational speed Nw from the wheel rotational speed sensor 16. Specifically, since the radius and circumference of the non-illustrated wheel are known, the actual traveled distance D of the vehicle 10 can be determined if the wheel rotational speed Nw is known. The actual traveled distance D of the vehicle 10 may be determined based on the number of revolutions [rev] of the drive shaft, not shown, of the vehicle 10, instead of the wheel rotational speed Nw. Alternatively, the actual traveled distance D of the vehicle 10 may be determined by determining the present position of the vehicle 10 from time to time by a navigation system, not shown.

The regenerated energy calculating function 82 calculates an amount of deceleration energy (regenerated energy) [Wh] (instantaneous value) regenerated per unit time when the vehicle 10 is decelerated (hereinafter referred to as "amount Ereg of regenerated energy"), as described in detail later.

The traveling range calculating function 84 calculates a range [km] (integrated value) that the vehicle 10 can travel on the amount Ereg of regenerated energy based on the amount Ereg of regenerated energy calculated by the regenerated energy calculating function 82 (hereinafter referred to as "traveling range Dreg"), as described in detail later.

The traveling range displaying function 86 judges whether the traveling range Dreg calculated by the Dreg calculating function 84 is to be displayed or not, and, if the traveling range Dreg is to be displayed, displays the traveling range Dreg according to a predetermined process, as described in detail later.

The driving evaluating function 88 is a function to judge whether an accelerating or decelerating operation by the driver is an operation to increase the traveling range Dreg or not, and displays the judgment as a driving evaluation. The driving evaluating function 88 may have its processing sequence performed according to US2011/0205044A1, for example.

According to US2011/0205044A1, an accelerating operation of the driver, a braking operation of the driver, and an engine idling operation performed by the driver are scored (see, for example, FIG. 11 of US2011/0205044A1). Based on the overall points obtained from the scored operations and driving operation, a score display area 35 of a second display unit 15 (see FIG. 2(b) of US2011/0205044A1) displays a score (point) that represents the way the driver drives the vehicle, as evaluated from the standpoint of fuel economy ([0054] of US2011/0205044A1). More specifically, a display configuration which is capable of displaying five leaves, displays the leaves such that the more the displayed leaves, the higher the score, thereby indicating that the driver is driving the vehicle for better fuel economy (see the same paragraph). According to US2011/0205044A1, furthermore, the second display unit 15 has a coaching display area 37 (see FIG. 2(b) of US2011/0205044A1). The coaching display area 37 displays evaluations of the accelerating operation of the driver and the braking operation of the driver (see, for example, through [0065] of US2011/0205044A1). According to the present embodiment, the display device 22 can utilize the driving evaluating function, including the above displayed items of information, disclosed in US2011/0205044A1.

The memory 74 (FIG. 1) according to the present embodiment comprises a RAM (Random Access Memory) for storing temporary data, etc. for use in various processing operations carried out by the processor 72 and a ROM (Read Only Memory) storing programs to be executed, tables or maps, etc.

(1-5-3. Operating Unit 62)

The operating unit 62 includes a display switching switch 90 (hereinafter referred to as "display switching SW 90") and a traveling range resetting switch 92 (hereinafter referred to as "Dreg resetting SW 92" or "resetting SW 92"). The display switching SW 90 is used to switch between displayed information on the display unit 64. The Dreg resetting SW 92 is used to reset the traveling range Dreg that the vehicle 10 can travel on regenerated energy.

(1-5-4. Display Unit 64 and Speaker 66)

The display unit 64, which is capable of displaying color images or monochromatic images, comprises a liquid crystal panel, an organic EL (Electro-Luminescence) panel, or an inorganic EL panel, for example. The speaker outputs sounds such as sound effects to be described later.

[1-6. Unified ECU 24]

The unified ECU 24 manages the vehicle 10 in its entirety. According to the present embodiment, the unified ECU 24 controls, for example, the wheel rotational speed sensor 16, the vehicle speed sensor 18, the external air temperature sensor 20, the motor ECU 34, the battery ECU 50, and the display ECU 60 via the communication line 52 (signal line). To the unified ECU 24, a signal from a start switch 100 (hereinafter referred to as "start SW 100") is input.

2. Processing Related to the Traveling Range Dreg on Regenerated Energy

According to the present embodiment, as described above, a traveling range Dreg that the vehicle 10 can travel on regenerated energy can be calculated and displayed.

Figure 2:
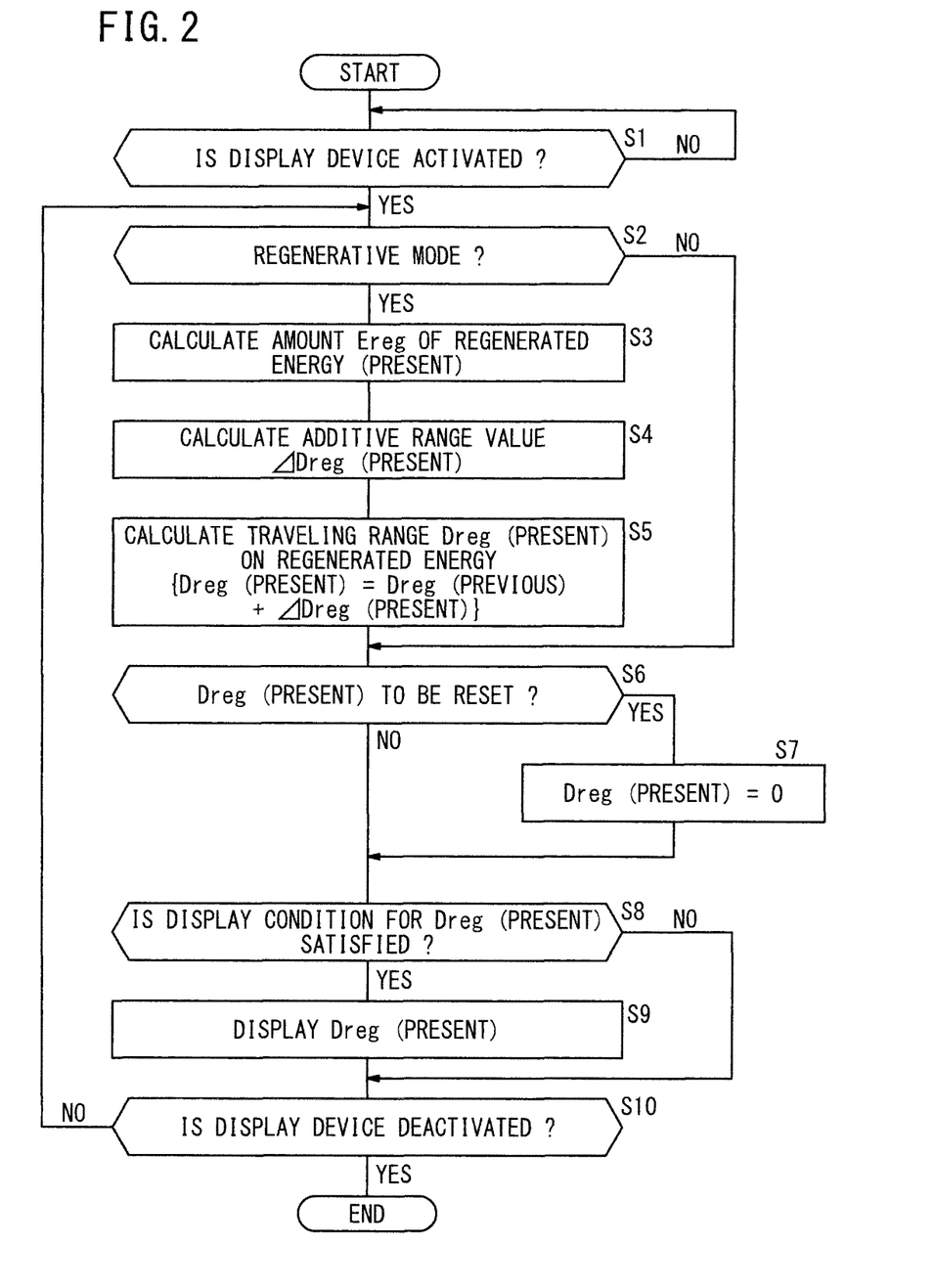
FIG. 2 is a flowchart of a processing sequence in relation to a traveling range that the electric vehicle can travel on regenerated energy.

FIG. 2 is a flowchart of a processing sequence in relation to the traveling range Dreg on regenerated energy. The flowchart shown in FIG. 2 represents the processing sequence concerning the traveling range Dreg on regenerated energy. It is noted that the processing sequence is performed separately from other processing sequences carried out by the display ECU 60, e.g., a processing sequence of the traveled distance calculating function 80 for calculating an actual traveled distance D and a processing sequence of the driving evaluating function 88 for evaluating the way the driver drives the vehicle 10. A value calculated in a present processing cycle (from S2 through S8 in FIG. 2) will hereinafter be accompanied by "(present)", and a value calculated in a previous processing cycle by "(previous)", whereby they are discriminated from each other.

In step S1, it is judged whether the display device 22 is activated or not. Specifically, if the start SW 100 is off, then the unified ECU 24 does not permit a 12-V battery, not shown, to supply electric power to the display device 22, and hence the display device 22 is not activated. If the start SW 100 is on, then the unified ECU 24 permits the 12-V battery to supply electric power to the display device 22, so that the display device 22 is activated. If the display device 22 is not activated (S1: NO), then control repeats step S1. If the display device 22 is activated (S1: YES), then control goes to step S2.

In step S2, the display ECU 60 (regenerated energy calculating function 82) judges whether the vehicle 10 is in the regenerative mode or not. For example, if the battery current Ibat detected by the current sensor 44 flows from the inverter 32 to the battery 40, then the display ECU 60 judges that the vehicle 10 is in the regenerative mode. However, as described later, the regenerative mode may be judged according to another process.

If the vehicle 10 is not in the regenerative mode (S2: NO), then control jumps to step S6. If the vehicle 10 is in the regenerative mode (S2: YES), then in step S3, the display ECU 60 (regenerated energy calculating function 82) calculates an amount Ereg of regenerated energy as an amount of deceleration energy (regenerated energy) regenerated in the present processing cycle. The display ECU 60 (regenerated energy calculating function 82) calculates an amount Ereg of regenerated energy using the battery voltage Vbat and the battery current Ibat, for example. Specifically, the display ECU 60 (regenerated energy calculating function 82) calculates an amount Ereg of regenerated energy by integrating a current (battery current Ibat) flowing into the battery 40 per unit time in the regenerative mode and a battery voltage Vbat across the battery 40 at that time.

In step S4, the display ECU 60 (Dreg calculating function 84) calculates an additive range value ΔDreg [km] in the present processing cycle. The additive range value ΔDreg represents a traveling range that the vehicle 10 can travel on the amount Ereg of regenerated energy, i.e., an amount per unit time, calculated in the present processing cycle. For example, the additive range value ΔDreg is calculated as follows: The actual traveled distance D up to that time (integrated value) is divided by an amount of consumed electric power corresponding thereto, and the quotient is determined as a traveling range per unit amount of electric power (hereinafter referred to as "unit traveling range"). Then, a value calculated by multiplying the unit traveling range by the amount Ereg of regenerated energy is used as the traveling range Dreg (ΔDreg=the unit traveling range×Ereg).

In step S5, the display ECU 60 calculates a traveling range Dreg (present) on the regenerated energy produced by the vehicle 10. The traveling range Dreg (present) in the present processing cycle is calculated as the sum of the traveling range Dreg (previous) in the previous processing cycle and the additive range value ΔDreg (present) determined in step S4 {Dreg (present)=Dreg (previous)+ΔDreg (present)}.

Figure 3:
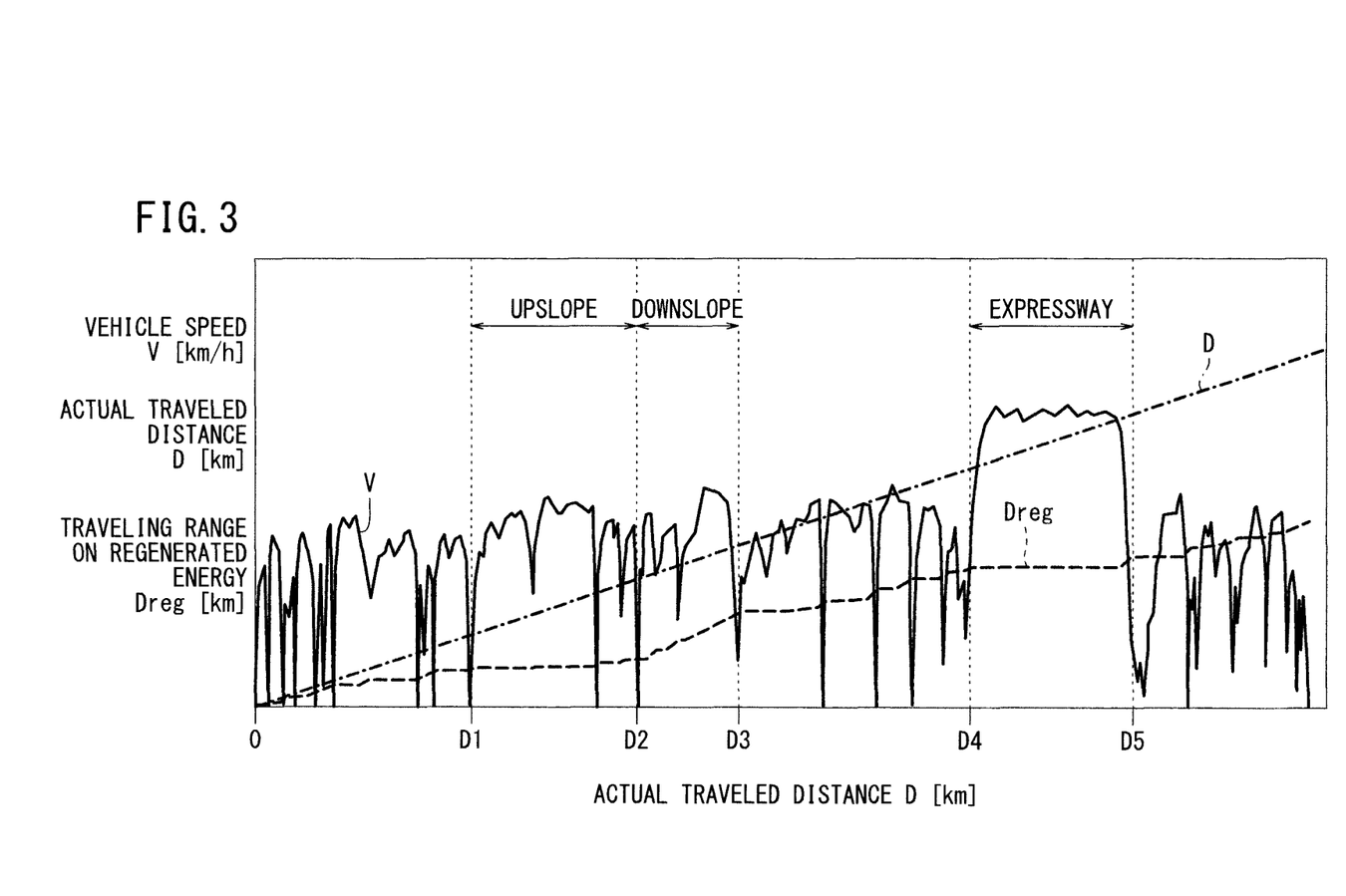
FIG. 3 is a diagram showing by way of example the relationship between vehicle speed, actual traveled distance (integrated value), and traveling range (integrated value) on regenerated energy.

FIG. 3 shows by way of example the relationship between vehicle speed V, actual traveled distance D (integrated value), and traveling range Dreg (integrated value) on regenerated energy. In FIG. 3, the vehicle 10 travels on a relatively flat road from 0 to D1 and from D3 to D4 in the actual traveled distance D, and travels on a relatively steep upslope from D1 to D2 in the actual traveled distance D. Consequently, almost no regenerated energy is produced, and the traveling range Dreg hardly increases at all.

From D2 to D3 in the actual traveled distance D, the vehicle 10 travels on a relatively steep downslope. Consequently, relatively large regenerated energy is produced, and the traveling range Dreg significantly increases. The vehicle 10 travels on an expressway from D4 to D5 in the actual traveled distance D. Therefore, almost no regenerated energy is produced, and the traveling range Dreg hardly increases at all.

Referring back to FIG. 2, if the vehicle 10 is not in the regenerative mode (S2: NO) or after step S5, the display ECU 60 (Dreg calculating function 84) judges whether the traveling range Dreg (present) is to be reset or not in step S6. Specifically, the display ECU 60 (Dreg calculating function 84) judges whether the Dreg resetting SW 92 of the operating unit 62 is pressed or not. Alternatively, as described later, the display ECU 60 (Dreg calculating function 84) may judge whether the traveling range Dreg (present) is to be reset or not based on other conditions.

If the traveling range Dreg (present) is not to be reset (S6: NO), then control goes to step S8. If the traveling range Dreg (present) is to be reset (S6: YES), then the display ECU 60 (Dreg calculating function 84) resets the traveling range Dreg (present) in step S7. Stated otherwise, the display ECU 60 (Dreg calculating function 84) sets the traveling range Dreg (present) in the present processing cycle to 0.

In step S8, the display ECU 60 (Dreg displaying function 86) judges whether a display condition for displaying the traveling range Dreg is satisfied or not. The display condition is a condition to be satisfied in order to display the traveling range Dreg (present) on the display unit 64.

According to the present embodiment, the display condition may be a certain timing such as when an integrated value of the amount Ereg of regenerated energy or an increase in the traveling range Dreg during a predetermined period exceeds a predetermined threshold value (hereinafter referred to as "increase threshold value"), when the regenerative mode continues for a predetermined time (hereinafter referred to as "regenerative mode judging time"), when the vehicle 10 is stopped, when the vehicle 10 is stopped after being braked, at a time immediately after the start SW 100 is turned off, when the vehicle 10 is travelling downhill, when the vehicle 10 is stopped after the regenerative mode while the vehicle 10 is travelling downhill, or when the display switching SW 90 is operated, for example. The traveling range Dreg may be displayed at all times.

If the display condition is not satisfied (S8: NO), then control goes to step S10. If the display condition is satisfied (S8: YES), then the display ECU 60 (Dreg displaying function 86) displays the traveling range Dreg (present) depending on the display condition in step S9.

Figure 4:
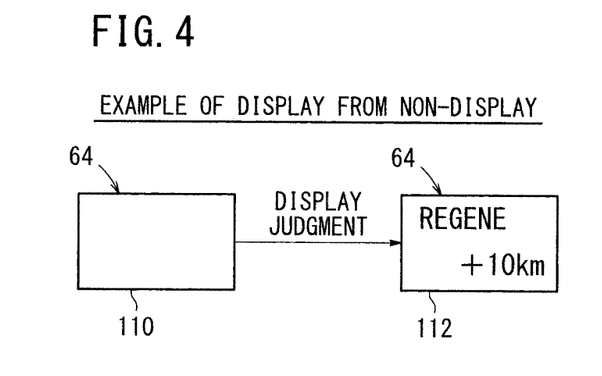
FIG. 4 is a diagram of a first example showing the manner in which a screen for not displaying a traveling range on regenerated energy and a screen for displaying the traveling range are switched.

FIGS. 4 through 7 show first through fourth examples showing the manner in which a screen for not displaying the traveling range Dreg on regenerated energy and a screen for displaying the traveling range Dreg are switched. FIG. 4 shows by way of example the manner in which a screen 110 on the display unit 64 that does not display any information including the traveling range Dreg is switched to a screen 112 that displays the traveling range Dreg. On the screen 112, the letters "REGENE" are an abbreviation of "regeneration", and indicate the display of the traveling range Dreg (the same applies to FIGS. 5 through 7). "+10 km" on the screen 112 represents the displayed value of the traveling range Dreg.

Figure 5:
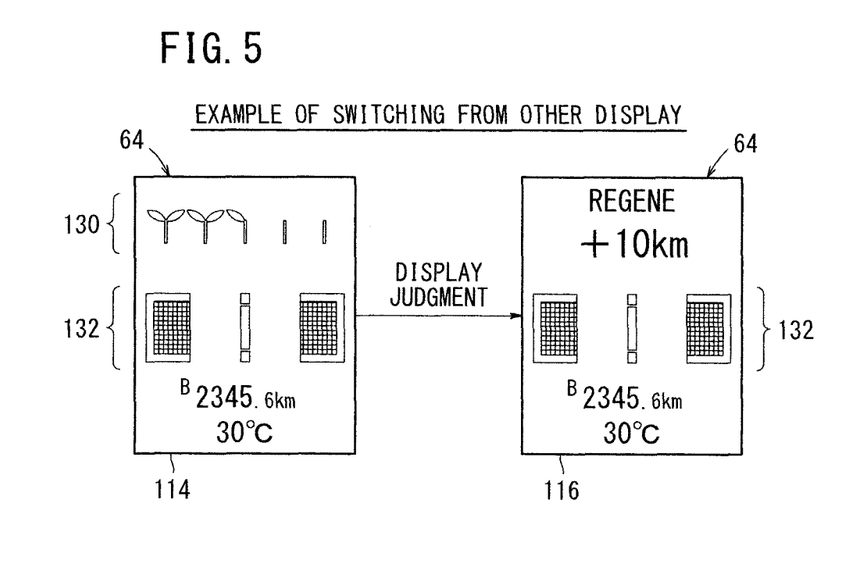
FIG. 5 is a diagram of a second example showing the manner in which a screen for not displaying a traveling range on regenerated energy and a screen for displaying the traveling range are switched.

FIG. 5 shows by way of example the manner in which a screen 114 that displays information excluding the traveling range Dreg is switched to a screen 116 that displays information including the traveling range Dreg. In FIG. 5, an area indicating a mark of leaves (hereinafter referred to as "score display area 130") is an area for displaying a score (point) that corresponds to the evaluation of the way the driver drives the vehicle 10 from the standpoint of fuel economy. According to the present embodiment, the value of a score is represented by the number of "leaves". A process of calculating the value of a score and a process of displaying the score display area 130 may utilize the processes disclosed in US2011/0205044A1 (see FIG. 2(b), [0054], etc. of US2011/0205044A1).

In FIG. 5, an area indicated by the reference numeral 132 (hereinafter referred to as "coaching display area 132") serves to coach the driver on the proper way to use the acceleration and the brake. A process of displaying the coaching display area 132 may utilize the process disclosed in US2011/0205044A1 (see FIG. 2(b), [0055] through [0065], etc. of US2011/0205044A1).

In FIG. 5, the letter "B" on the screens 114, 116 indicates the display of the actual traveled distance D. According to the present embodiment, specifically, the actual traveled distance D can be displayed selectively in "A" and "B" (see FIG. 6). On the screens 114, 116 shown in FIG. 5, "B" is selected. On the screens 114, 116 shown in FIG. 5, the characters "2345.6 km" indicate the actual traveled distance D at the time "B" is selected. Furthermore, the characters "30° C." on the screen 114, 116 shown in FIG. 5 represent the output value (external air temperature Tex) of the external air temperature sensor 20.

When the screen 114 is switched to the screen 116 as shown in FIG. 5, the area which has displayed the score display area 130 on the screen 114 displays "REGENE" and "+10 km" on the screen 116, thereby displaying the traveling range Dreg.

Figure 6:
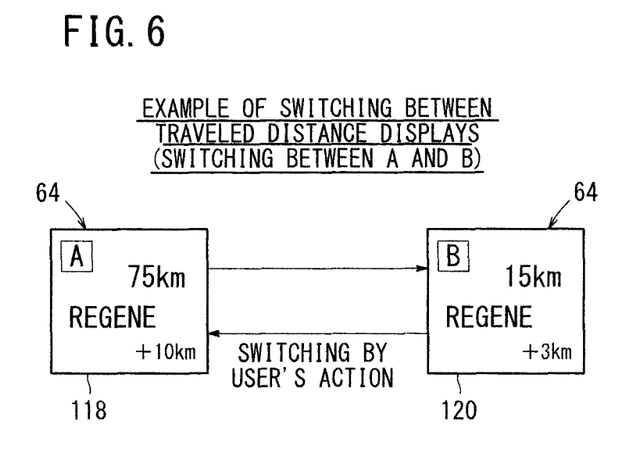
FIG. 6 is a diagram of a third example showing the manner in which a screen for not displaying a traveling range on regenerated energy and a screen for displaying the traveling range are switched.

FIG. 6 shows by way of example the manner in which a screen 118 that displays the actual traveled distance D in "A" is switched to a screen 120 that displays the actual traveled distance D in "B". On the screen 118, "A" indicates that the actual traveled distance D is displayed in "A", and "75 km" indicates the actual traveled distance D at the time "A" is selected. In addition, on the screen 118, "REGENE" indicates the display of the traveling range Dreg, and "+10 km" indicates the value of the traveling range Dreg at the time "A" is selected.

On the screen 120, "B" indicates that the actual traveled distance D is displayed in "B", and "15 km" indicates the actual traveled distance D at the time "B" is selected. In addition, on the screen 120, "REGENE" indicates the display of the traveling range Dreg, and "+3 km" indicates the value of the traveling range Dreg at the time "B" is selected.

As described above, the actual traveled distance D can be displayed selectively in two modes (hereinafter referred to as "trip modes"), making it possible to display actual traveled distances D from different points of time. The screens 118, 120 can be switched from one to the other by the user operating the display switching SW 90. The points of time at which to start calculating actual traveled distances D in the two trip modes "A", "B" may be set using a switch (for resetting the actual traveled distance D), not shown, included in the operating unit 62, for example.

In FIG. 6, the traveling range Dreg is displayed at all times. When the screens 118, 120 are switched from one to the other, the trip modes are also switched from one to the other, and the corresponding traveling ranges Dreg are also switched from one to the other.

Figure 7:
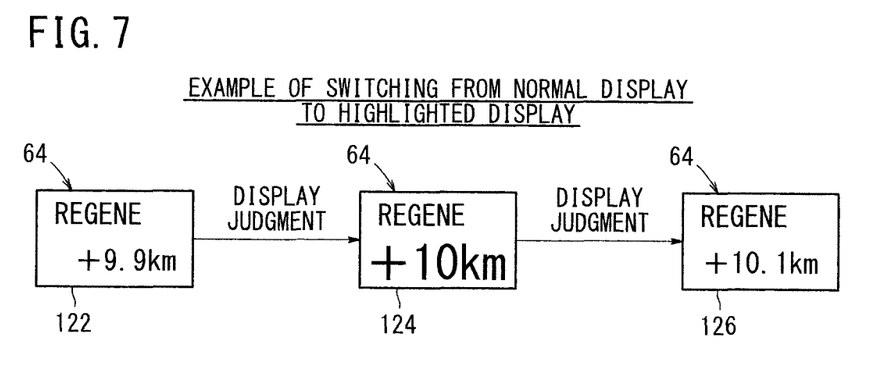
FIG. 7 is a diagram of a fourth example showing the manner in which a screen for not displaying a traveling range on regenerated energy and a screen for displaying the traveling range are switched.

FIG. 7 shows by way of example the manner in which, while the traveling range Dreg on regenerated energy is being displayed at all times, a screen 122 for normal display is switched to a screen 124 for highlighted display, which is then switched back to a screen 126 for normal display. In FIG. 7, the traveling range Dreg is highlighted, i.e., displayed in a larger character size than normal, only when the traveling range Dreg takes a predetermined value, e.g., a round number in the present embodiment ("+10 km" in FIG. 7). Alternatively, the traveling range Dreg may be highlighted when it falls within a predetermined range, rather than when it takes a predetermined value. The traveling range Dreg may be highlighted in other ways than being displayed in a larger character size than normal. For example, the traveling range Dreg may be highlighted by being displayed in a different color, or by being displayed at a higher brightness level, or by being displayed in combination with a character that is not displayed normally. Further alternatively, not only the traveling range Dreg is highlighted in display, but also a certain sound effect may be output by the speaker 66.

Referring back to FIG. 2, in step S10, it is judged whether the display device 22 is deactivated or not. Specifically, if the start SW 100 is on, then the unified ECU 24 permits the 12-V battery to continuously supply electric power to the display device 22, and hence the display device 22 keeps activated. If the start SW 100 is off, then the unified ECU 24 controls the 12-V battery to stop supplying electric power to the display device 22, so that the display device 22 is deactivated. If the display device 22 is not deactivated (S10: NO), then the present processing cycle is finished, and control goes back to step S2 to start a next processing cycle. If the display device is deactivated (S10: YES), then the present processing cycle is finished, and the processing sequence shown in FIG. 2 is ended.

3. Advantages of the Present Embodiment

According to the present embodiment, as described above, the actual traveled distance D (integrated value) of the vehicle 10 is displayed on the display unit 64 (the screens 114, 116 shown in FIG. 5 and the screens 118, 120 shown in FIG. 6), and the traveling range Dreg (integrated value) which represents an extension of the traveling range increased by the regenerated deceleration energy is also displayed on the display unit 64 (the screen 112 shown in FIG. 4, the screen 116 shown in FIG. 5, the screens 118, 120 shown in FIG. 6, and the screens 122, 124, 126 shown in FIG. 7). Consequently, the regenerated deceleration energy can be converted into the traveling range Dreg for easy comparison with the actual traveled distance D of the vehicle 10, thus allowing the occupant of the vehicle 10 to easily appreciate how effective the regenerated deceleration energy is.

According to the present embodiment, it is judged whether the traveling range Dreg on regenerated energy is to be displayed or not based on a certain display condition (S8 in FIG. 2), and only if the display condition is satisfied, the traveling range Dreg is displayed (S9). Therefore, the traveling range Dreg that corresponds to the regenerated deceleration energy can be displayed in a situation that is appropriate for the driver.

According to the present embodiment, it is judged whether an accelerating or decelerating operation by the driver is an operation to increase the traveling range Dreg or not, and the judgment is displayed as a driving evaluation (see the score display area 130 on the screen 114 shown in FIG. 5). Then, the display in the score display area 130 is switched to the display of the traveling range Dreg, so that the traveling range Dreg on regenerated energy is displayed in the same position as the display position in the score display area 130 (see the screen 116 shown in FIG. 5). Since the score display area 130 (driving evaluation) and the traveling range Dreg on regenerated energy are displayed in the same position, the occupant finds it easy to associate the driving evaluation in the score display area 130 with the traveling range Dreg, and hence can look at the driving evaluation more objectively.

According to the present embodiment, the display condition referred to above may be set to a timing when the vehicle 10 is stopped after the regenerative mode while the vehicle 10 is travelling downhill. Generally, during the regenerative mode while the vehicle 10 is travelling downhill, it is possible to regenerate a relatively large amount of deceleration energy, and the traveling range Dreg corresponding to the regenerated amount of deceleration energy is increased. Consequently, the occupant who sees the traveling range Dreg is able to recognize how important the regenerative mode is.

B. Modifications:

The present invention is not limited to the above embodiment, but may employ various arrangements based on the disclosure of the above description. For example, the present invention may employ the following arrangements:

1. Object that Incorporates the Display Device:

In the above embodiment, the display device 22 is incorporated in the vehicle 10 which has the single motor 30 and the single battery 40. However, it is not limited to being incorporated in such a vehicle, and the display device 22 may be incorporated in other objects. For example, the display device 22 may be incorporated in an electric vehicle having a propulsive motor and a regenerative motor separately. The display device 22 may also be incorporated in a hybrid vehicle having an engine in addition to the motor 30, or a fuel cell vehicle having fuel cells in addition to the motor 30 and the battery 40. The display device 22 may further be incorporated not only in the electric vehicle 10, but also in mobile objects such as ships, aircrafts, bicycles, etc.

2. Motor 30:

In the above embodiment, the motor 30 comprises a three-phase AC brushless motor. However, the motor 30 is not limited to the above insofar as it can propel the vehicle 10. For example, another motor such as a three-phase AC brush motor, a single-phase AC motor, or a DC motor may be used.

3. Judgment of the Regenerative Mode:

In the above embodiment, it is judged whether the vehicle is in the regenerative mode or not based on the battery current Ibat detected by the current sensor 44 (S2 in FIG. 2). However, other values may be used insofar as they are effective to judge the regenerative mode. For example, the regenerative mode may be judged when the electric power supplied to the motor 30 is of a negative value or when the value of input and output electric power in the entire vehicle 10, which includes the electric power consumed by an air compressor, auxiliaries, etc., not shown, is of a negative value. Alternatively, the regenerative mode may be judged when the vehicle 10 is judged as being decelerated based on at least one of the vehicle speed V from the vehicle speed sensor 18, positional information from a navigation system, not shown, and an output value from a gyro sensor, not shown. Alternatively, the deceleration (regenerative mode) may be judged based on an operation quantity of an accelerator pedal or a brake pedal, not shown.

4. Resetting of the Traveling Range Dreg on Regenerated Energy:

In the above embodiment, the traveling range Dreg is reset on the condition that the Dreg resetting SW 92 is turned on. However, the traveling range Dreg may be reset on other conditions. For example, the traveling range Dreg may be reset based on a user's operation, e.g., when the start SW 100 is turned off, when the battery 40 is charged through the charging circuit 46 and the charging connector 48, or when the display switching SW 90 is operated to switch display screens (see FIG. 6, for example). Alternatively, the traveling range Dreg may be reset at a preset time, e.g., once a day or once a week. Further alternatively, the traveling range Dreg may be reset when the actual traveled distance D has reached a preset distance. The resetting conditions may be set, for example, using a switch, not shown, on the operating unit 62, or the like.

5. Display on the Display Unit 64:

In the above embodiment, the display unit 64 displays the traveling range Dreg (integrated value) on regenerative energy. However, the display unit 64 may display the additive range value ΔDreg (instantaneous value) or a traveling range Dreg per unit time in addition to or instead of the traveling range Dreg (integrated value) on regenerative energy.

The invention claimed is:

1. A display device for an electric vehicle which is propelled by supplying electric power from an electric storage device to a first electric motor, converts deceleration energy of the electric vehicle into electric power with the first electric motor or a second electric motor, and stores the electric power as regenerated electric energy in the electric storage device, the display device being configured to:
    calculate an integrated value of an actual traveled distance of the electric vehicle as a first distance;
    detect that the deceleration energy is regenerated;
    calculate an integrated value of a traveling range which is increased by regeneration of the deceleration energy, as a second distance; and
    display the first distance and the second distance on one display unit,
    wherein the display device is configured to:
    judge whether an accelerating or decelerating operation by a driver of the electric vehicle is an operation to increase the traveling range or not, and display the judgment as a driving evaluation;
    switch from the displaying of the driving evaluation to the displaying of the second distance; and
    display the second distance in the same position as the position where the driving evaluation is displayed.

2. The display device for the electric vehicle according to claim 1, wherein the display device is configured to:
    judge whether the second distance is to be displayed or not based on a predetermined display condition; and
    display the second distance only if the predetermined display condition is satisfied.

3. The display device for the electric vehicle according to claim 2, wherein the predetermined display condition is a timing when the electric vehicle is stopped after the deceleration energy is regenerated while the electric vehicle is traveling downhill.

\* \* \* \* \*